(12) United States Patent
Ripkens et al.

(10) Patent No.: US 9,221,620 B2
(45) Date of Patent: Dec. 29, 2015

(54) METHOD OF ARRANGING CONTAINERS, SUCH AS BOTTLES OR CANS, FOR FORMING GROUPS OF CONTAINERS TO BE PACKAGED AS A GROUP IN A CONTAINER FILLING PLANT, AND APPARATUS THEREFOR

(75) Inventors: Hans-Gerd Ripkens, Goch (DE); Tuchwat Schagidow, Geldern (DE); Sebastian Kamps, Kleve (DE); Thomas Rütten, Kranenburg (DE)

(73) Assignee: KHS GmbH, Dortmund (DE)

( * ) Notice: Subject to any disclaimer, the term of this patent is extended or adjusted under 35 U.S.C. 154(b) by 446 days.

(21) Appl. No.: 12/706,601

(22) Filed: Feb. 16, 2010

(65) Prior Publication Data

US 2010/0257818 A1    Oct. 14, 2010

Related U.S. Application Data

(63) Continuation-in-part of application No. PCT/EP2008/006117, filed on Jul. 25, 2008.

(30) Foreign Application Priority Data

Aug. 16, 2007    (DE) .......................... 10 2007 038 827

(51) Int. Cl.
    *B65G 21/06*    (2006.01)
    *B65G 47/08*    (2006.01)
    (Continued)

(52) U.S. Cl.
    CPC .............. *B65G 47/088* (2013.01); *B65G 17/26* (2013.01); *B65G 21/06* (2013.01); *B65G 47/28* (2013.01); *B65G 47/841* (2013.01); *B65G 2201/0244* (2013.01)

(58) Field of Classification Search
    CPC .. B65G 47/841; B65G 47/844; B65G 47/088; B65G 47/08

USPC ................. 53/251, 263, 534, 543; 198/459.6, 198/419.3, 418.7, 419.2
See application file for complete search history.

(56) References Cited

U.S. PATENT DOCUMENTS 3,190,434 A *  6/1965  Dardaine ................... 198/419.3
3,194,382 A    7/1965  Nigrelli et al.
(Continued)

FOREIGN PATENT DOCUMENTS

DE           40 36 341 A1    5/1992
DE         196 01 207 A1    7/1997
(Continued)

OTHER PUBLICATIONS

International Search Report PCT/EP2008/006117 and English translation thereof Dec. 8, 2008, 3 pages.
(Continued)

*Primary Examiner* — Stephen F Gerrity
(74) *Attorney, Agent, or Firm* — Nils H. Ljungman & Associates

(57) ABSTRACT

An article-grouping device which has at least three independently-driven drive arrangements and a plurality of divider elements located on crossbeams. Each of the drive arrangements moves the crossbeams, and thus moves the divider elements thereon to a position between adjacent articles in a stream of articles on a conveyor arrangement to divide the stream of articles into separated groups of articles. Each of the drive arrangements comprises a drive shaft and a pair of elongated driven elements, such as endless chains or toothed belts. At least two of the drive shafts both drive a pair of driven elements and support pairs of driven elements driven by other drive shafts.

17 Claims, 8 Drawing Sheets

(51) Int. Cl.
*B65G 47/28* (2006.01)
*B65G 17/26* (2006.01)
*B65G 47/84* (2006.01)

(56) References Cited

U.S. PATENT DOCUMENTS

| | | | |
|---|---|---|---|
| 4,552,261 A | 11/1985 | Raudat et al. | |
| 4,718,540 A * | 1/1988 | Greenwell | 198/620 |
| 5,065,856 A * | 11/1991 | Reid et al. | 198/419.3 |
| 5,203,444 A | 4/1993 | Munch | |
| 5,540,036 A | 7/1996 | Scroggin et al. | |
| 5,667,055 A * | 9/1997 | Gambetti | 198/419.3 |
| 5,701,726 A * | 12/1997 | Smith | 53/544 |
| 6,112,880 A * | 9/2000 | Flix | 198/419.2 |
| 6,550,605 B1 | 4/2003 | Therrien et al. | |
| 6,763,929 B2 | 7/2004 | Malini | |
| 7,481,309 B2 | 1/2009 | Wagner et al. | |
| 7,543,424 B2 * | 6/2009 | Lechner et al. | 53/281 |
| 8,286,781 B2 * | 10/2012 | Kamps et al. | 198/419.3 |
| 2004/0011625 A1 | 1/2004 | Malini | |
| 2005/0108992 A1 | 5/2005 | Wagner et al. | |
| 2008/0099307 A1 | 5/2008 | Fleck et al. | |
| 2009/0283385 A1 | 11/2009 | Takayama et al. | |

FOREIGN PATENT DOCUMENTS

| | | |
|---|---|---|
| DE | 203 15 764 U1 | 3/2004 |
| DE | 603 00 115 T2 | 2/2006 |
| DE | 10 2004 042 474 A1 | 3/2006 |
| DE | 10 2005 063 193 A1 | 7/2007 |
| EP | 0 403 079 | 12/1990 |
| EP | 1 382 532 | 1/2004 |
| EP | 1 522 508 A | 4/2005 |
| JP | 2001 072 235 | 3/2001 |
| WO | WO 2006/024460 | 3/2006 |
| WO | WO 2008/007738 A | 1/2008 |

OTHER PUBLICATIONS

German Office Action 10 2007 038 827.8-22, Apr. 15, 2008, 5 pages.

* cited by examiner

METHOD OF ARRANGING CONTAINERS, SUCH AS BOTTLES OR CANS, FOR FORMING GROUPS OF CONTAINERS TO BE PACKAGED AS A GROUP IN A CONTAINER FILLING PLANT, AND APPARATUS THEREFOR

CONTINUING APPLICATION DATA

This application is a Continuation-In-Part application of International Patent Application No. PCT/EP2008/006117, filed on Jul. 25, 2008, which claims priority from Federal Republic of Germany Patent Application No. 10 2007 038 827.8, filed on Aug. 16, 2007. International Patent Application No. PCT/EP2008/006117 was pending as of the filing date of this application. The United States was an elected state in International Patent Application No. PCT/EP2008/006117.

BACKGROUND

1. Technical Field

The present application relates to a device for the formation of product groups from a stream of a plurality of identical or substantially identical packaged goods that are fed via conveyor devices with a delivery path and divider elements on at least one pair of driven, endless circulating chains, toothed belts etc., which divider elements are cyclically engaged in the product stream at a right angle to the plane of transport.

2. Background Information

Background information is for informational purposes only and does not necessarily admit that subsequently mentioned information and publications are prior art.

A grouping device of this type underneath a conveyor line is illustrated, for example, in, which shows stop elements that are introduced in the product stream from below and which are provided on endless circulating belt-like or chain-like drive elements. The distance between a pair of grouping elements thereby corresponds to the distance for the most recently handled product group size, as it is to be delivered to the packing machines, i.e. one of the elements defines the forward area of the product group in the direction of transport while the rear element is introduced between the subsequent bottles to hold them back as the first group is transported onward for further processing. When the cycle for continued transport is then actuated, the group can then be transported forward separately.

A similar configuration of grouping devices of this type may involve a beam with divider fingers located on one side of the conveyor belt below the plane of transport, and on the opposite side is a second beam with a second group of divider fingers, the operation of which is approximately same as the first device described above.

It has now been found that these configurations represent a certain restriction with regard to the variation of the equipment to handle different dimensions of product groups, which is the case, for example, when the equipment in question is to be converted to handle other product sizes.

The objective in modern packaging plants is to be able to handle a large number of different products on equipment of this type. For example, it must be or should be possible to convert the machine from the handling of large mineral water bottles to smaller bottles such as beer bottles, for example, and again to even smaller packaging units such as beverage cans, for example. To do that, it must be or should be possible to change the distances between the contact elements and the position of these elements as quickly and easily as possible without any long-term disruptions in the operation of such a plant.

An additional problem is that it is desirable to be able to insert the contact elements from below very exactly perpendicularly or substantially perpendicular upward between the products being transported, i.e. go avoid, restrict, and/or minimize any upward pivoting movement to prevent, restrict, and/or minimize the formation of a fulcrum, for which purpose guides, e.g. in the form of contact grooves, are provided on the side cheeks of the device frame, although the presence of these guides can also result in certain structural restrictions. It is essential and/or desired to achieve the most accurate possible static positioning of the contact elements.

OBJECT OR OBJECTS

An object of the present application is to make it possible to adapt the grouping devices with the maximum possible flexibility, which renders a corresponding plant suitable for the handling of very different products with an accurate positioning of the contact elements.

SUMMARY

The present application teaches that this object is accomplished by at least three drive shafts located inside a device frame for three pairs of chains/toothed belts, etc. with contact elements.

With the present application, it is possible to provide at least three pairs of chains or similar components at the point of product group formation with corresponding contact elements and to position these contact elements so that different group sizes are made possible.

At this point it should be noted that when the term "chain pairs" is used in the rest of the description, the term is defined as including the corresponding propulsion elements in circulation, i.e. also pairs of belts, pairs of toothed belts and corresponding elements.

The present application is not restricted to three drive shafts for three chain pairs, but also includes a plurality of drive shafts and chain pairs, to form a plurality of groups of packaged goods or beverage bottles, beverage cans, etc., which are then fed to packing machines which pack these units correspondingly and place them in cartons or on palettes, to cite a few examples. In one embodiment, several chain pairs can be deactivated if their operation is not required and/or desired for one batch or packing task. For this purpose the cross beams on which the contact elements are fastened can be removed.

Configurations of the present application are described according to the present application. For example, the pulley wheels for the shafts that support the chains are realized in the form of drive shafts for one chain pair and in the form of sprocket wheel bearing shafts for the other chain pairs.

For example, if three drive shafts are provided, the shafts that generally carry the reversing pulleys on their respective ends each form the drive shaft for one chain pair and the third drive shaft acts on the third chain pair. To achieve a corresponding synchronization, the third and/or additional drive shaft for the third and/or additional chain pair can be connected by means of an operational connection such as chain slings, toothed belts, etc. with the drive sprocket of the third or fourth chain pair on the respective bearing shaft.

The contact elements are each located on a cross beam that carries a chain pair. That means that, for example, the cross beams have a double-sided mounting, i.e. they are statically positioned, which is not the case when the solution comprises a beam that is mounted on one side.

To make possible a rapid adaptation to different products, the present application also teaches that the contact elements can be pivoted into or below the plane of the cross beams when they are not being used, whereby the contact elements on the cross beams can also be interchangeable and/or variable in terms of their position or their distance from one another.

The present application also teaches a common control for the drive motors, which can be adapted to the current number of drive motors and thus chain pairs. This type of control can also be used, for example, to pivot the contact elements up and down e.g. by means of magnetic actuator motors etc. if the contact elements are equipped with their own drives in the crossbeams.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Additional details, features and embodiments of the present application are described in greater detail below and with reference to the accompanying drawings, in which.

DESCRIPTION OF EMBODIMENT OR EMBODIMENTS

Figure 1:
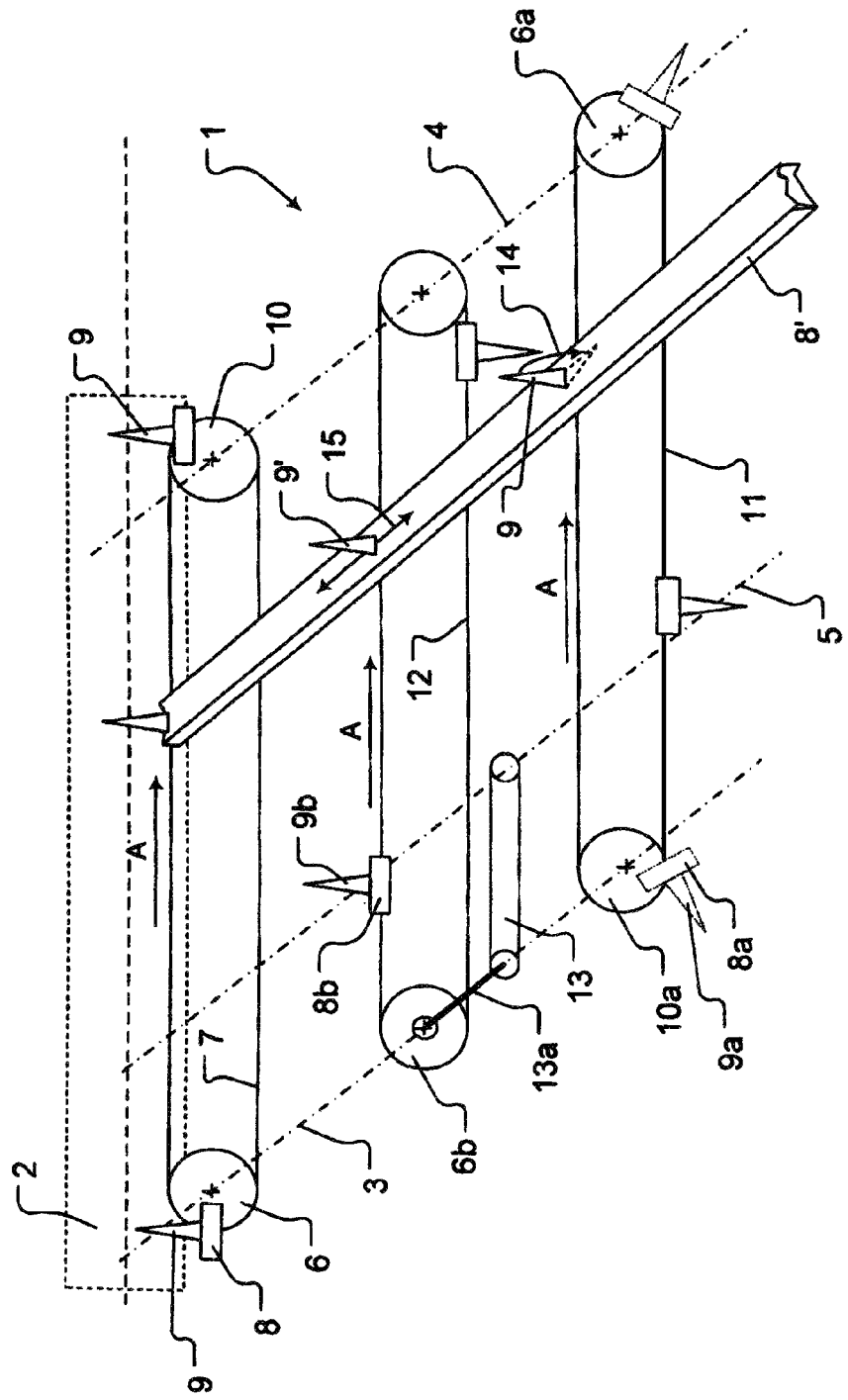
FIG. 1 is a schematic illustration of a device according to the present application.

Of the device according to the present application, which is designated 1 in general, one side cheek of the device frame 2 is illustrated schematically, in which three shafts are mounted, namely an end shaft 3 on the left side of the figure in FIG. 1, an end shaft 4 positioned on the other end of the device and a shaft designated 5 positioned between them, each of which is used to drive a chain pair, whereby FIG. 1 shows one endless chain of each chain pair.

Although the motorized drives, e.g. in the form of servomotors, are not shown here, a chain drive sprocket 6 of the first chain, designated 7 here, of a chain pair is driven by means of the shaft 3, whereby this chain pair is equipped with cross beams 8 oriented across the entire width of the device 1 and equipped with the indicated contact elements 9.

The shaft 4 carries a planetary wheel designated 10 for the circulating chain. The shaft 4 is simultaneously or substantially simultaneously used, by means of a motor which is not illustrated in any further detail, for an additional chain pair, of which one chain 11 is illustrated, the reversing pulley of which is designated 10a and is mounted on the shaft 3.

The chain 11 also carries cross beams 8a with contact elements 9a.

A drive sprocket 6b for a third chain 12 is driven by means of a drive shaft 5 which is also mounted in the device frame 2, and for this purpose an operational connection, e.g. a chain loop 13, is provided. This third chain 12 also carriers cross beams 8b with contact elements 9b. As shown in the figure, this device according to the present application can be used to position a plurality of cross beams 8, shown in FIG. 1 where they are designated 8', with in turn a plurality of contact elements 9 or 9', to make it possible to adapt the device to different units.

FIG. 1 also shows, with a curved arrow 14 on the cross beam 8' that a contact element 9' can be folded down into the plane of the crossbeam 8'. The double arrow 15 indicates that the contact elements 9' can also be variably positioned in terms of their positions at a right angle to the direction of transport on the crossbeams.

Figure 8:
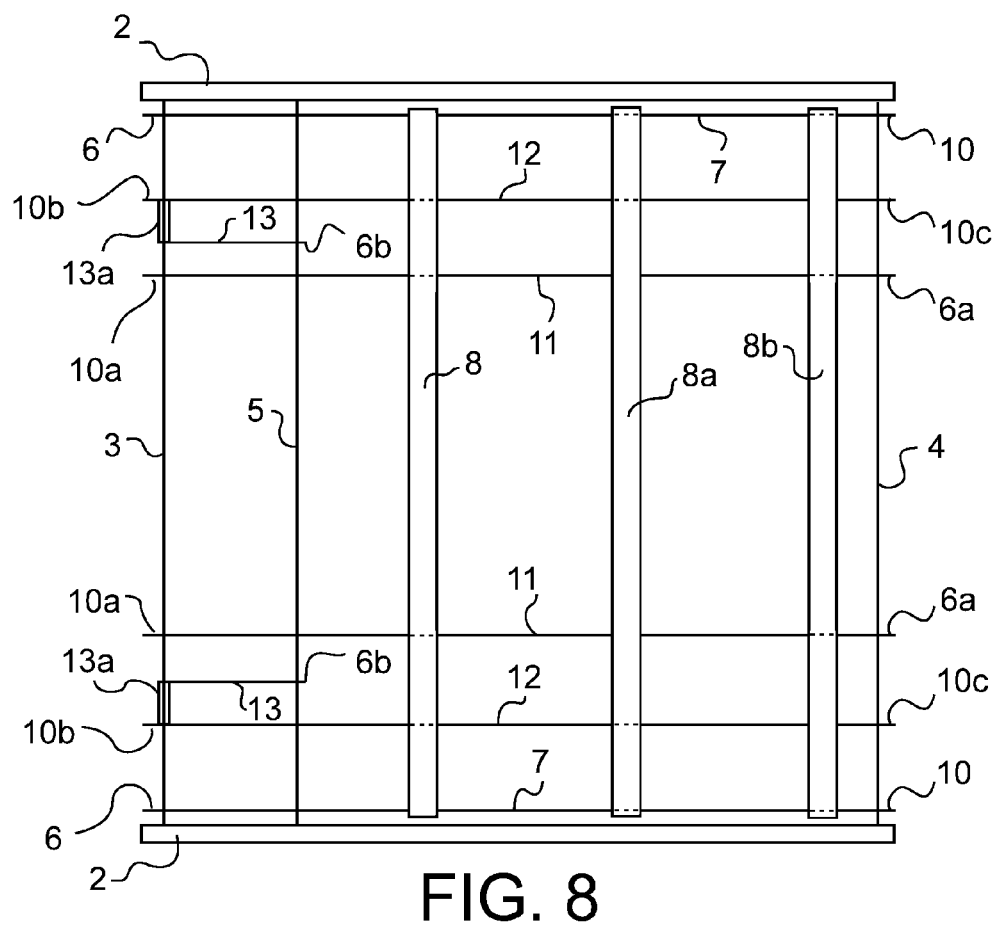
FIG. 8 is a simplified schematic top view of the device shown in FIG. 1.

FIG. 8 is a simplified schematic top view of the device shown in FIG. 1. As can be seen in FIG. 8, the crossbeams 8, 8a, 8b extend across the width of the conveyor path from one side of the device frame 2 to the other. Crossbeam 8 is connected at each end to the pair of first chains 7, but is not connected to second chain 11 or third chain 12, as represented by the dashed lines. Likewise, crossbeam 8a is only connected to the second chains 11, and crossbeam 8b is only connected to the third chains 12. The three crossbeams 8, 8a, and 8b are shown for exemplary purposes, and should not be understood as limiting the embodiments to only three crossbeams. Each of the drive shafts 3, 4, 5 have a corresponding pair of drive sprockets 6, 6a, 6b connected thereto, respectively, to impart a drive force to a corresponding pair of the chains 7, 11, and 12, respectively. Specifically, drive shaft 3 may be rotated to rotate drive sprockets 6, which in turn drive chains 7. Drive shaft 4 may be rotated to rotate drive sprockets 6a, which in turn drive chains 11. Finally, drive shaft 5 may be rotated to rotate drive sprockets 6b, which in turn drive chains 12. Chains 12 are not directly connected to drive sprockets 6b, but rather are connected by the chain loops 13 to operation connections 13a. Each of the operation connections 13a is connected to wheel 10b that supports and drives the chains 12, to thereby impart the rotational driving force generated by the drive shaft 5 to the drive chains 12. Wheels 10, 10a, 10b, and 10c are rotatable on the shafts 3 or 4 on which they are supported, but are not driven by these shafts 3, 4 since they are not affixed thereto. Specifically, wheels 10a and 10b are supported on shaft 3, but are not rotated by shaft 3. Wheels 10 and 10c are supported on shaft 4, but are not rotated by shaft 4. Operation connections 13a are supported on shaft 3, but are not rotated by shaft 3. In this manner, all of the chain pairs 7, 11, and 12 are supported on only two of the shafts 3 and 4, although they are each driven by the separate shafts 3, 4, and 5, so that each chain pair may be driven independently of the others.

Figure 2A:
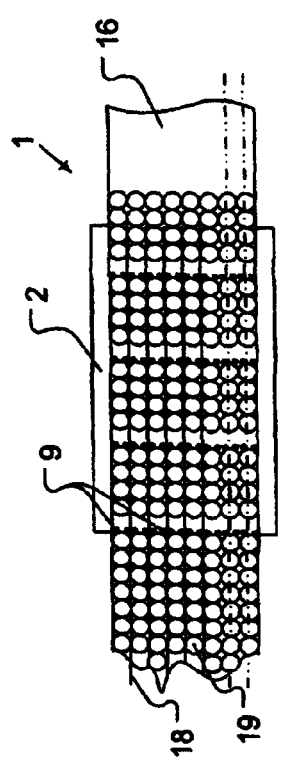
FIG. 2A is a highly simplified illustration of a possible product group that can be achieved with the device according to the present application.
Figure 2B:
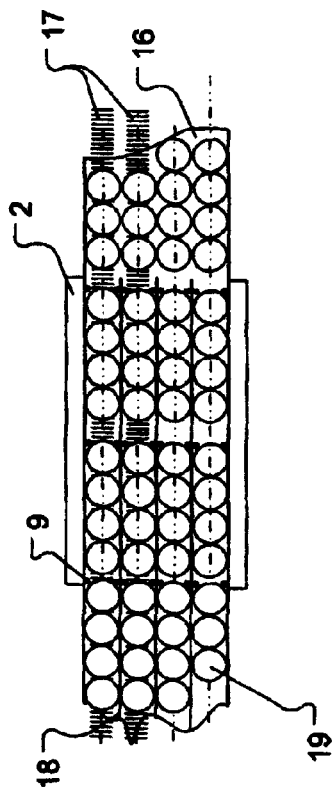
FIG. 2B is also a highly simplified illustration of a possible product group that can be achieved with the device according to the present application.
Figure 2C:
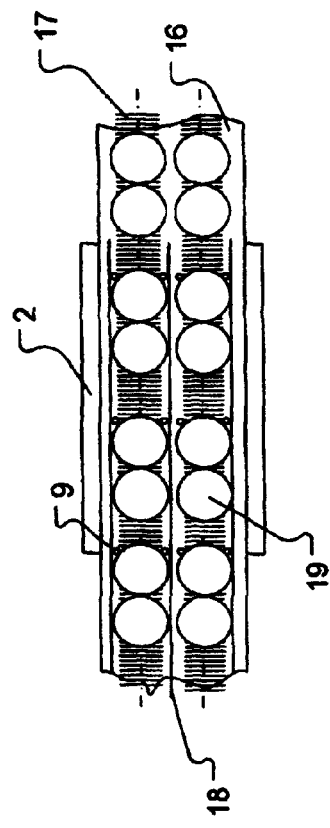
FIG. 2C is also a highly simplified illustration of a possible product group that can be achieved with the device according to the present application.

Merely by way of example, FIGS. 2A, 2B, and 2C show different containers that can be grouped into bundles or packaging units and have different diameters. These containers 19 are on a conveyor path designated 16 which is formed by a plurality of individual conveyor belts 17. Located between the individual conveyor belts 17 are partitions 18, so that the containers are guided into lanes by the divider unit 1. FIGS. 2A, 2B, and 2C also show that the contact elements 9, which are located alongside the individual conveyor belts 17, always or substantially always engage a container 19 in pairs, which was not illustrated in FIG. 1 to keep the diagram simple.

In other words, and in accordance with at least one possible embodiment of the present application, a pair of contact elements 9 may engage a container 19. The position of the contact elements 9 may be changed manually, or automatically with the use of a control device.

Figure 3:
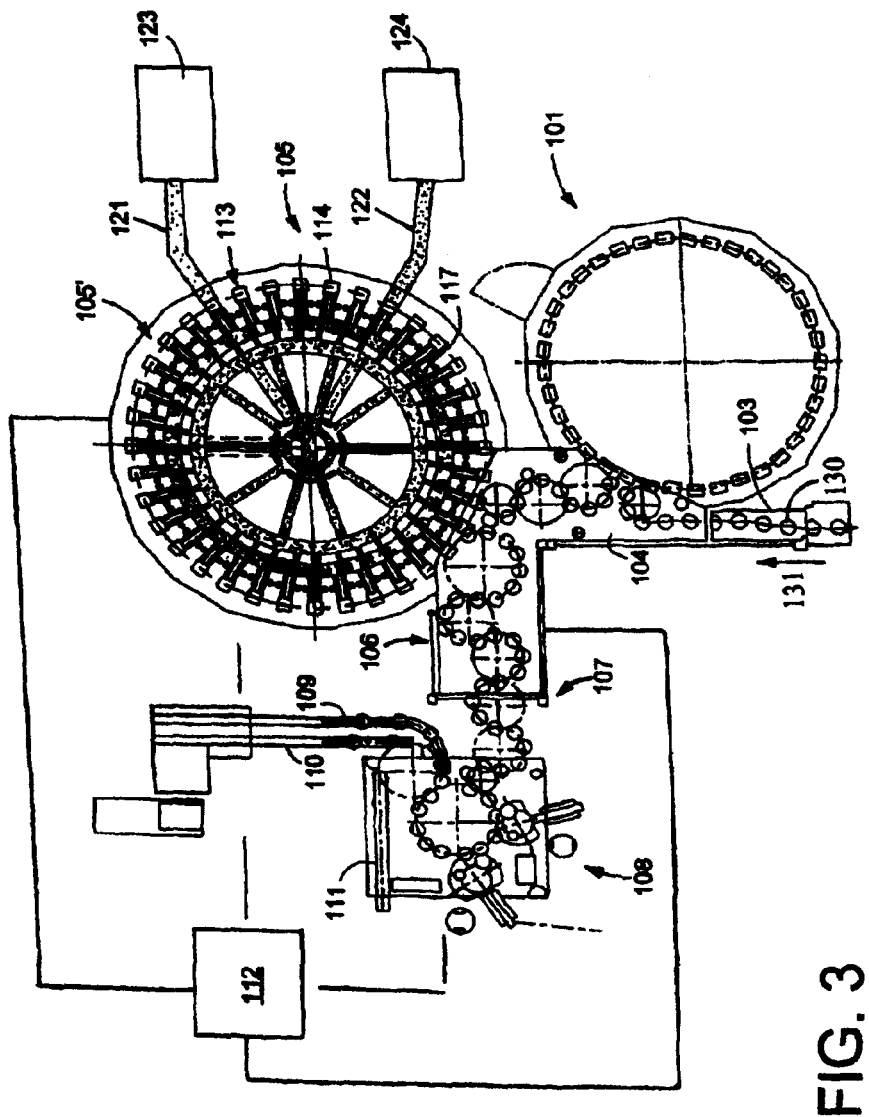
FIG. 3 shows schematically the main components of one possible embodiment example of a system for filling containers, in accordance with at least one possible embodiment, in which system or plant could possibly be utilized at least one aspect, or several aspects, of the embodiments disclosed herein.

FIG. 3 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 3 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 3, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyer arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Figure 4:
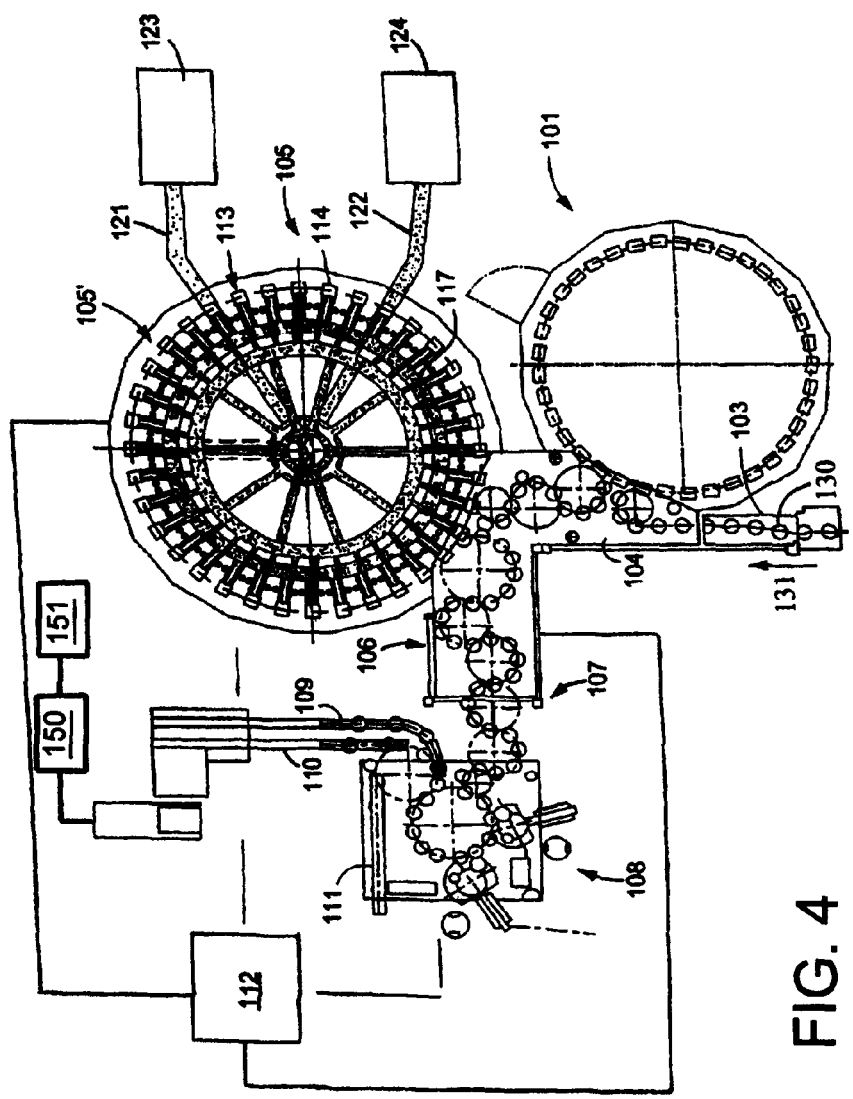
FIG. 4 shows another example of a system for filling containers or beverage bottles with the device according to the present application.

FIG. 4 shows schematically the main components of another possible embodiment example of a system for filling containers, including the device 150 of the present application, which groups filled, closed, and labeled containers. The grouped containers are then fed into a packaging machine and/or shrinkwrapping machine 151. In at least one possible embodiment, the bottles or containers may not be labeled prior to be grouped and packaged by the device 150 and the machine 151.

The device of the present application may be utilized to form groups of products. These products may include, but are not limited to, beverage bottles, containers, cans, boxes, bags, and/or other types of packages or products.

Figure 5:
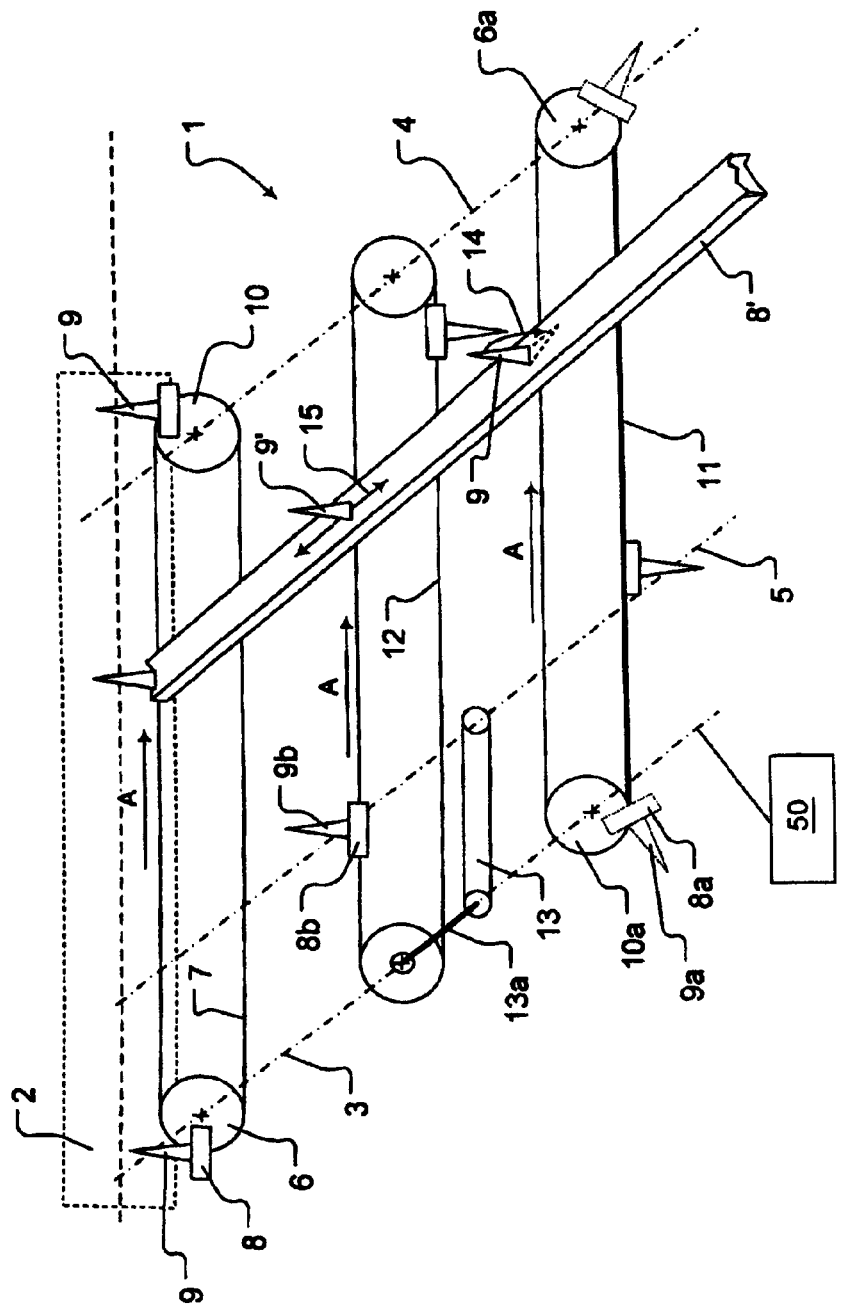
FIG. 5 is another schematic illustration of a device according to the present application.

FIG. 5 shows one possible embodiment of the device 1 of the present application. In this embodiment of the present application, the shaft 3 may be operatively connected to a motor 50. The motor 50 may drive the shaft 3, which then drives the sprocket 6 and the chain.

In another possible embodiment of the present application, the shaft 3 and/or the drive wheels 6 and 10*a* are driven by the chain lop 13 and the operation connection 13*a*, which connects the chain loop 13 to the shaft 3.

In at least one possible embodiment of the present application, the chains 7, 11, and 12 may be driven at substantially the same speed. Additionally, each of the individual conveyor belts 17 may be driven at substantially the same speed as one another. The speed of the chains 7, 11, and 12 and the speed of the individual conveyor belts 17 may differ from one another. For example, the speed of the chains 7, 11, and 12 may be lesser than the speed of the individual conveyor belts 17. The speeds of the chains and/or conveyors may be constant or substantially constant.

In one possible embodiment of the present application, the containers or packages to be grouped may be transported by a conveyor arrangement. The conveyor arrangement may comprise a plurality of individual conveyor belts 17. The contact elements 9 may be driven around the chains 7, 11, and 12, such that the contact elements 9 rise between the individual conveyor belts 17 in order to act on and/or impede the movement of the containers 19 to be grouped.

Figure 6:
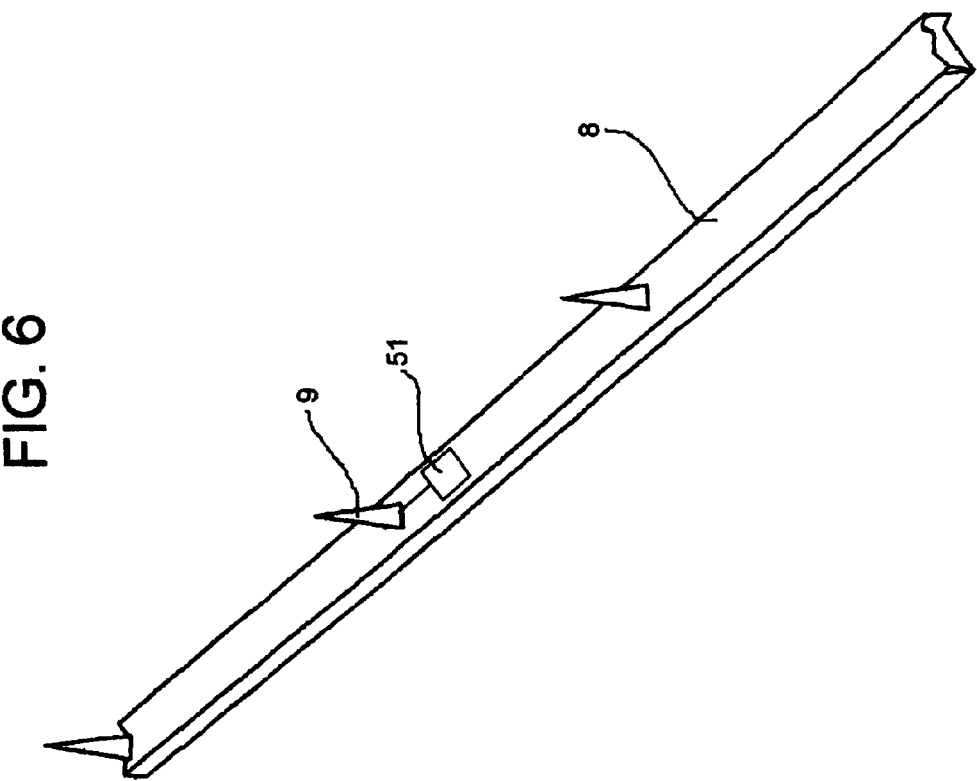
FIG. 6 shows one possible embodiment of a crossbeam of the present application.

FIG. 6 may show a representation of a crossbeam 8 according to at least one possible embodiment of the present application. The contact element 9 may be disposed on the crossbeam 8. The contact element 9 may be disposed at an exact or virtually exact right angle to the surface of the crossbeam 8. The contact element 9 may be configured to be moved along the length of the crossbeam 8. The contact element 9 may be configured to be moved toward either end of the crossbeam 8 along the length of the crossbeam 8. The contact element 9 may be connected to a motor 51 inside the crossbeam 8. The motor 51 may be configured to move the contact element 9 along the length of the crossbeam 8. The motor 51 may be a hydraulic motor. In at least one other possible embodiment of the present application, the motor 51 may be a pneumatic motor. In at least one other possible embodiment, the motor 51 may be an electric motor. In at least one other possible embodiment of the present application, the motor 51 may be a linear drive or linear drive system. In at least one other embodiment, the motor 51 may be a screw drive motor.

In at least one possible embodiment of the present application, the contact element 9 may be configured to be moved into a position so that the contact element 9 lays as flatly as possible against the surface of the crossbeam 8. That is, the contact element 9 may be configured to be moved to lay horizontally or virtually horizontally on the surface of the crossbeam 8.

Figure 7:
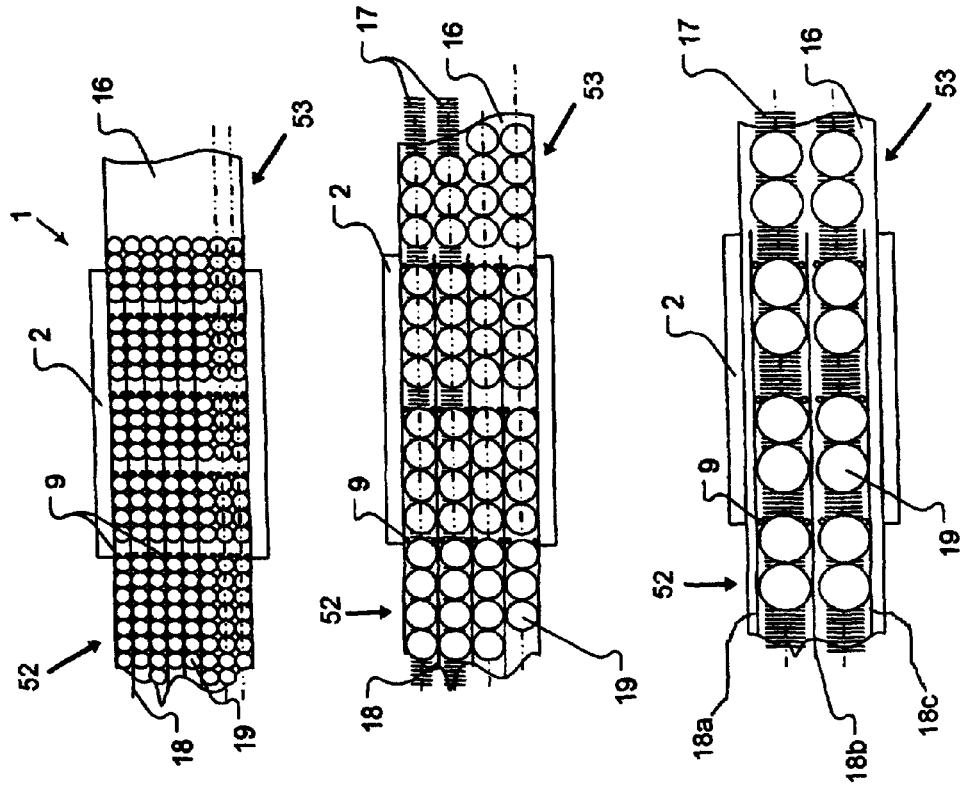
FIG. 7A is a highly simplified illustration of a possible product group that can be achieved with the device according to the present application.
FIG. 7B is also a highly simplified illustration of a possible product group that can be achieved with the device according to the present application.
FIG. 7C is also a highly simplified illustration of a possible product group that can be achieved with the device according to the present application.

FIGS. 7A, 7B, and 7C show possible embodiments of the device in combination with a conveyor system for containers. These embodiments each comprise an inlet 52 and an outlet 53. These embodiments also comprise a plurality of partitions 18. The possible embodiment seen in FIG. 7C comprises a partition 18*a*, a partition 18*b*, and a partition 18*c*. These partitions may be adjustable. For example, the partition 18*b* may be positioned so that the containers 19, on either side of the partition 18*b*, may come into contact with the partition 18*b*. The partition 18*b* may then help guide the containers 19 as the containers 19 are transported along the length of the conveyor belts 17.

Depending on the size of the containers 19, the partitions 18 may be adjusted, as well as the spacing of the contact elements 9. For example, if containers 19 are being transported with large diameters, the partitions 18 may be spread apart at distances equal or substantially equal to the diameters of the bottles 19. Then, if the device 1 of the present application will be used to group containers 19 of a different, smaller diameter, the distances between the partitions 18 may be reduced, i.e. spread apart at distances equal or substantially equal to the diameters of the different, smaller containers 19.

The contact elements 9 may be arranged along each crossbeam 8 in pairs. One contact element 9 from each pair of contact elements 9 may be disposed along each crossbeam so that one contact element 9 is disposed at each limit of each individual conveyor belt 17 width. The two contact elements 9 in each pair of contact elements 9 are parallel or substantially parallel to one another on opposite sides of each individual conveyor belt 17 width. Each contact element 9 may be disposed along the crossbeam 8 at an exact or virtually exact ninety degree, right angle to the crossbeam. Thus, two contact elements may be disposed on each crossbeam for each individual conveyor belt 17 in the conveyor system. For example, FIG. 2B may show at least one possible embodiment of the present application in which there are four conveyor belts 17 disposed along the conveyor path 16. In this embodiment, there may be eight contact elements 9 disposed along each crossbeam.

Depending on the size of the containers 19, the contact elements 9 may be adjusted. For example, if the containers 19, which are being transported, have large diameters, the pairs contact elements 9 may be spread apart at a first distance in order to engage the containers 19 in pairs. Then, if the device 1 of the present application will be used to group containers 19 of a different, smaller diameter, the distances between the contact elements 9 may be reduced, i.e. spread apart at a second distance in order to engage the containers 19 in pairs. In other words, the partitions 18 may be moved and/or adjusted, in order to accommodate containers or bottles with different diameters.

A gap may be produced between groups of containers 19 on the conveyor belts 17, as a result from the contact elements 9 acting on the containers 19. For example, as the contact element 9, disposed on the crossbeam 8, rotates around the sprocket wheel, for example sprocket wheel 6, the contact element 9 may rise up and act on the containers 19 on the individual conveyor belts 17. The contact elements 9 may impede the forward movement of the containers 19 on the conveyor belts 17 as the contact elements 9 rotate around the sprocket and/or wheel 6, and therefore produce a gap between groups of containers. Once the contact elements 9 have fully rotated around the wheels or sprockets, the contact elements 9 may then be driven along the length of the chains at a speed that is less than the speed of the conveyors 17. The individual conveyor belts 17 may then drive the groups of containers 19 together into a group or tightly spaced group of containers 19.

The device 1 of the present application may be used in a plant to group packages, beverage bottles, containers, beverage cans, and/or other types of packages and containers. The device 1 of the present application is configured to group together packages in a manner that reduces the equipment required and/or desired to group packages. The arrangement 1 of the present application may or may not be configured to add separators or inserts between the packages to be grouped.

The device 1 of the present application comprises a sole conveyor belt 17 for each lane of packages. For example, each sole belt 17 is configured to transport packages from the inlet 52 to the outlet 53 of the device 1 in each lane. For example, as seen in FIG. 7C, the sole belt between partitions 18a and 18b may transport containers from the inlet 52 to the outlet 53. This belt 17 may be configured to be driven at one constant or one substantially constant speed during operation of the device 1. This belt 17 may at least span the length of the device 1 to transport packages from the inlet 52 to the outlet 53. The contact elements 9 of the device 1 may be the sole structures of the device 1 which impede the transport of the packages. In at least one possible embodiment of the present application, the height of the contact elements 9 may be greater than the length of the contact elements 9.

The contact elements 9 may rotated around the chain in such a manner that the contact elements are positioned vertically or substantially vertically as the contact elements rotate around the sprockets and/or wheels of the device 1. U.S. Pat. No. 4,552,261 discloses an apparatus configured to position contact elements vertically or substantially vertically.

An apparatus 1 for forming groups of products from a flow of a multiplicity of identical or substantially identical products supplied via conveyor devices, with a feed path and with dividing elements, which engage cyclically into the product flow transversely with respect to the transporting plane at three pairs of driven, endlessly circulating chains, toothed belts or the like, with at least three drive shafts 3, 4, 5 which are arranged within an apparatus frame 2 and are intended for the three pairs of chains 7, 11, 12 with engagement elements 9.

One feature or aspect of an embodiment is believed at the time of the filing of this patent application to possibly reside broadly in a device 1 for the formation of product groups from a stream of a plurality of identical or substantially identical packaged goods that are fed by means of conveyor devices with a feed path and divider elements on at least one pair of driven, endless circulating chains, toothed belts, etc., which divider elements are inserted cyclically at a right angle to the transport plane, comprising at least three drive shafts 3, 4, 5 located inside a device frame 2, for three pairs of chains/toothed belts 7, 11, 12, etc. with contact elements 9.

Another feature or aspect of an embodiment is believed at the time of the filing of this patent application to possibly reside broadly in the device, wherein the shafts 3-5 that carry the reversing sprockets for the chains 7, 11, 12 are realized in the form of a drive shaft for a chain pair and in the form of sprocket wheel bearing shafts for the other chain pairs.

Yet another feature or aspect of an embodiment is believed at the time of the filing of this patent application to possibly reside broadly in the device, wherein the third 5 and/or additional drive shaft for the third 12 and/or additional chain pair is connected by means of a operational connection 13, 13a such as chain slings, toothed belts, etc. with the drive sprocket 6b of the third or fourth chain pair on the respective bearing shaft.

Still another feature or aspect of an embodiment is believed at the time of the filing of this patent application to possibly reside broadly in the device, wherein the contact elements 9 are located on crossbeams 8, each of which is mounted on a chain pair.

A further feature or aspect of an embodiment is believed at the time of the filing of this patent application to possibly reside broadly in the device, wherein the contact elements 9 can be pivoted into or below the plane of the crossbeams 8 when not in use Arrow 14.

Another feature or aspect of an embodiment is believed at the time of the filing of this patent application to possibly reside broadly in the device, wherein the contact elements 9 on the crossbeams 8 are interchangeable and/or the distance between them can be varied Arrow 15.

Yet another feature or aspect of an embodiment is believed at the time of the filing of this patent application to possibly reside broadly in the device, wherein a common control system for the drive motors is provided which can be adapted to the respective number of drive motors and thus chain pairs 7, 11, 12.

Still another feature or aspect of an embodiment is believed at the time of the filing of this patent application to possibly reside broadly in the device, wherein when the device is operated for the intended purpose, one or more drive shafts 3, 4, 5 or chain/toothed belt pairs can be stopped, while the other drive shaft(s) or chain/toothed belt pair(s) can continue to be driven.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein, except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

Some examples of bottling systems, which may be used or adapted for use in at least one possible embodiment of the present application may be found in the following U.S. Patents assigned to the Assignee herein, namely: U.S. Pat. Nos. 4,911,285; 4,944,830; 4,950,350; 4,976,803; 4,981,547; 5,004,518; 5,017,261; 5,062,917; 5,062,918; 5,075,123; 5,078,826; 5,087,317; 5,110,402; 5,129,984; 5,167,755; 5,174,851; 5,185,053; 5,217,538; 5,227,005; 5,413,153; 5,558,138; 5,634,500; 5,713,403; 6,276,113; 6,213,169; 6,189,578; 6,192,946; 6,374,575; 6,365,054; 6,619,016; 6,474,368; 6,494,238; 6,470,922; and 6,463,964.

Some examples of stepping motors that may possibly be utilized or possibly adapted for use in at least one possible embodiment of the present application may possibly be found in the following U.S. patents: U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

Some examples of servo-motors that may possibly be utilized or possibly adapted for use in at least one possible embodiment of the present application may possibly be found in the following U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025,684 issued to Yasui on Feb. 15, 2000.

Some examples of synchronous motors which may possibly be utilized or adapted for use in at least one possible embodiment may possibly be found in the following U.S. Pat. No. 6,713,899, entitled "Linear synchronous motor;" U.S. Pat. No. 6,486,581, entitled "Interior permanent magnet synchronous motor;" U.S. Pat. No. 6,424,114, entitled "Synchronous motor;" U.S. Pat. No. 6,388,353, entitled "Elongated permanent magnet synchronous motor;" U.S. Pat. No. 6,329,728, entitled "Cylinder-type linear synchronous motor;" U.S. Pat. No. 6,025,659, entitled "Synchronous motor with movable part having permanent magnets;" U.S. Pat. No. 5,936,322, entitled "Permanent magnet type synchronous motor;" and U.S. Pat. No. 5,448,123, entitled "Electric synchronous motor."

The Innopack packaging machine, manufactured by KHS Maschinen and Anlagenbau AG, is an example of a packaging machine which may possibly be utilized or adapted for use in at least one possible embodiment. Some other examples of packaging machines which may possibly be utilized or adapted for use in at least one possible embodiment may possibly be found in the following U.S. Patents: U.S. Pat. No. 4,964,260, entitled "Packaging machine for cardboard boxes and process for packaging articles in cardboard boxes;" U.S. Pat. No. 4,785,610, entitled "Automatic machine for packaging products of different kinds in boxes;" U.S. Pat. No. 5,265,398, entitled "Automatic counting and boxing machine;" U.S. Pat. No. 5,943,847, entitled "Packaging machine for multi-packs;" U.S. Pat. No. 5,937,620, entitled "Packaging machine for multi-packs;" U.S. Pat. No. 5,711,137, entitled "Packaging machine and method of packaging articles;" and U.S. Pat. No. 5,706,633, entitled "Packaging machine and method of packaging articles."

Some examples of shrink wrapping machines or machines for wrapping items in plastic film which may possibly be utilized or adapted for use in at least one possible embodiment may possibly be found in the following U.S. Patents: U.S. Pat. No. 6,826,893, entitled "Apparatus for wrapping products with plastic film;" U.S. Pat. No. 6,739,115, entitled "Equipment for wrapping groups of products in plastic film;" U.S. Pat. No. 5,878,555, entitled "Apparatus for wrapping articles in plastic film;" U.S. Pat. No. 5,787,691, entitled "Apparatus for wrapping articles in plastic film;" U.S. Pat. No. 5,519,983, entitled "Shrink wrap packaging system with an ultrasonic side sealer;" U.S. Pat. No. 4,956,963, entitled "Method of sealing a shrink wrap package;" U.S. Pat. No. 4,873,814, entitled "Method of making a shrink wrap package;" U.S. Pat. No. 4,214,419, entitled "Collating and shrink wrap packaging apparatus;" U.S. Pat. No. 6,484,475, entitled "Modular packaging machine;" U.S. Pat. No. 4,694,633, entitled "Film wrapping machine;" U.S. Pat. No. 4,118,916, entitled "Thermoplastic wrapping machine;" U.S. Pat. No. 4,118,916, entitled "Thermoplastic wrapping machine;" U.S. Pat. No. 5,371,999, entitled "Shrink film wrapping machine;" U.S. Pat. No. 4,748,795, entitled "Film wrapping machine;" and U.S. Pat. No. 5,115,620, entitled "Wrapping machine."

Some examples of linear drives that may possibly be utilized or possibly adapted for use in at least one possible embodiment of the present application may possibly be found in the following U.S. patents: U.S. Pat. No. 7,649,285 issued to Ueda on Jan. 19, 2010; U.S. Pat. No. D596,652 issued to Roither, et al. on Jul. 21, 2009; U.S. Pat. No. 7,528,561 issued to Kawai, et al. on May 5, 2009; U.S. Pat. No. 6,992,408 issued to Finkbeiner, et al. on Jan. 31, 2006; U.S. Pat. No. 7,064,464 issued to Ickinger on Jun. 20, 2006; and U.S. Pat. No. 7,055,423 issued to Stoll, et al. on Jun. 6, 2006.

Some examples of hydraulic drives that may possibly be utilized or possibly adapted for use in at least one possible embodiment of the present application may possibly be found in the following U.S. Patents: U.S. Pat. No. 6,993,906 issued to Smothers, et al. on Feb. 7, 2006; U.S. Pat. No. 7,024,964 issued to Fukuchi on Apr. 11, 2006; U.S. Pat. No. 6,990,807 issued to Bird, et al. on Jan. 31, 2006; U.S. Pat. No. 6,968,685 issued to Stall on Nov. 25, 2005; U.S. Pat. U.S. Pat. No.

4,969,389 issued to Foster on Nov. 13, 1990; U.S. Pat. No. 5,829,336 issued to Schulze on Nov. 3, 1998; and U.S. Pat. No. 7,281,372 issued to Sakai, et al. on Oct. 16, 2007.

Some examples of movement threads or screw drives that may possibly be utilized or possibly adapted for use in at least one possible embodiment of the present application may possibly be found in the following U.S. Patents: U.S. Pat. No. 7,357,048 issued to Hartig, et al. on Apr. 15, 2008; U.S. Pat. No. 6,000,308 issued to LaFountain, et al. on Dec. 14, 1999; U.S. Pat. No. 5,535,638 issued to Willison on Jul. 16, 1996; U.S. Pat. No. 5,704,250 issued to Black on Jan. 6, 1998; U.S. Pat. No. 5,664,372 issued to Williams, et al. on Sep. 9, 1997; U.S. Pat. No. 5,219,099 issued to Spence, et al. on Jun. 15, 1993; and U.S. Pat. No. 4,322,987 issued to Gartner on Apr. 6, 1982.

Some examples of pneumatic arrangements that may possibly be utilized or possibly adapted for use in at least one possible embodiment of the present application may possibly be found in the following U.S. Patents: U.S. Pat. No. 6,609,767 issued to Mortenson et al. on Aug. 26, 2003; U.S. Pat. No. 6,632,072 issued to Lipscomb et al. on Oct. 14, 2003; U.S. Pat. No. 6,637,838 issued to Watanabe on Oct. 28, 2003; U.S. Pat. No. 6,659,693 issued to Perkins et al. on Dec. 9, 2003; U.S. Pat. No. 6,668,848 issued to Ladler et al. on Dec. 30, 2003; and U.S. Pat. No. 6,676,229 issued to Marra et al. on Jan. 13, 2004.

Some examples of pneumatic drives that may possibly be utilized or possibly adapted for use in at least one possible embodiment of the present application may possibly be found in the following U.S. Patents: U.S. Pat. No. 5,676,033 issued on Oct. 14, 1997 to Szabo; U.S. Pat. No. 4,841,845 issued to Beullens on Jun. 27, 1989; U.S. Pat. No. 6,633,015 issued to Nguyen, et al. on Oct. 14, 2003; U.S. Pat. No. 4,794,841 issued to Kemmler, et al. on Jan. 3, 1989; U.S. Pat. No. 5,432,653 issued to Moore, et al. on Jul. 11, 1995; U.S. Pat. No. 4,563,939 issued to Siegrist on Jan. 14, 1986; and U.S. Pat. No. 4,414,882 issued to Frei on Nov. 14, 1983.

The following patents, patent applications or patent publications, are hereby incorporated by reference as if set forth in their entirety herein, except for the exceptions indicated herein: DE 40 36 341 A1, having the following English translation of the German title "CONTAINER GROUPING APPARATUS," published on May 21, 1992; DE 10 2004 042 474 A1, having the following English translation of the German title "DEVICE FOR GROUPING INDIVIDUALLY PACKAGED GOODS," published on Mar. 23, 2006; and DE 10 2005 063 193 A1, having the following English translation of the German title "Packaged goods e.g. container, grouping device, has position detecting device to detect position of part of packaged goods with respect to transport plane and to output position signal, which is characterized for detected position of goods," published on Jul. 5, 2007.

All of the patents, patent applications or patent publications, which were cited in the German Office Action dated Apr. 15, 2008, and/or cited elsewhere are hereby incorporated by reference as if set forth in their entirety herein, except for the exceptions indicated herein, as follows: U.S. Pat. No. 6,550,605, having the title "Apparatus and method for feeding elongated elements," published on Apr. 22, 2003; JP 200 1072 235, having the following English translation of the Japanese title "ARTICLE GROUPING DEVICE," published on Mar. 21, 2001; DE 603 00 115, having the following English translation of the German title "A device for separating continuously fed products into groups," published on Feb. 16, 2006; and U.S. Pat. No. 3,194,382, having the title "Article grouper and spacer," published on Jul. 13, 1965.

All of the patents, patent applications or patent publications, which were cited in the International Search Report dated Dec. 8, 2008, and/or cited elsewhere are hereby incorporated by reference as if set forth in their entirety herein, except for the exceptions indicated herein, as follows: EP 1,522,508, having the following English translation of the German title "Separating, synchronising and accumulating device," published on Apr. 13, 2005; DE 203 15 764, having the following English translation of the German title "Goods packing machine, includes pair of drive parts for filling, synchronising and compacting goods," published on Feb. 19, 2004; U.S. Pat. No. 4,552,261, having the title "Article grouper for case packer," published on Nov. 12, 1985; U.S. Pat. No. 5,540,036, having the title "Variable pitch escapement for article infeed in packaging machine," published on Jul. 30, 1996; WO 2008/007738, having the following English translation of the Japanese title "PROCESS FOR MANUFACTURING A MASTERBATCH FOR INJECTION MOLDING OR FOR EXTRUSION," published on Jan. 17, 2008; and DE 19601207, having the following English translation of the German title "Rank or position stages for piece goods conveyor," published on Jul. 24, 1997.

The patents, patent applications, and patent publication listed above in the preceding paragraphs are herein incorporated by reference as if set forth in their entirety, except for the exceptions indicated herein. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2007 038 827.8, filed on Aug. 16, 2007, having inventors Hans-Gerd RIPKENS, Tuchwat SCHAGIDOW, Sebastian KAMPS, and Thomas ROTTEN, and DE-OS 10 2007 038 827.8 and DE-PS 10 2007 038 827.8, and International Application No. PCT/EP2008/006117, filed on Jul. 25, 2008, having WIPO Publication No. WO2009/021608 and inventors Hans-Gerd RIPKENS, Tuchwat SCHAGIDOW, Sebastian KAMPS, and Thomas ROTTEN, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein, except for the exceptions indicated herein.

The purpose of incorporating the corresponding foreign equivalent patent application(s), that is, PCT/EP2008/

006117 and German Patent Application 10 2007 038 827.8, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2008/006117 and DE 10 2007 038 827.8 from which this patent application claims priority which do not have to do with the correction of the translation in this patent application are not to be included in this patent application in the incorporation by reference.

Any statements about admissions of prior art in the original foreign patent applications PCT/EP2008/006117 and DE 10 2007 038 827.8 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein, except for the exceptions indicated herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. An article-grouping device comprising:
   at least three pairs of endless chains or toothed belts;
   at least three independently-driven drive arrangements, each configured to drive a corresponding pair of said endless chains or toothed belts;
   a plurality of divider elements being configured to be moved between adjacent articles in a stream of articles on a conveyor arrangement to divide the stream of articles into groups of articles;
   a plurality of elongated crossbeams, each being mounted on a corresponding pair of said endless chains or toothed belts to permit movement of said crossbeams by said endless chains or toothed belts;
   each of said crossbeams comprising a crossbeam surface extending along the length of said crossbeam and disposed to face away from said endless chains or toothed belts;
   each of said divider elements being mounted on a corresponding one of said crossbeams, and being pivotable to a first position in which each of said divider elements projects away from its crossbeam surface;
   each of said divider elements being pivotable toward its crossbeam surface from said first position to a second position in which each of said divider elements either:
   lies on and essentially parallel to its crossbeam surface; or
   has moved into its crossbeam past its crossbeam surface.

2. The article-grouping device according to claim 1, wherein each of said drive arrangements comprises a drive shaft, and at least two of said drive shafts are configured to both drive a pair of endless chains or toothed belts and support supporting sprockets for pairs of endless chains or toothed belts driven by other drive shafts.

3. The article-grouping device according to claim 2, wherein said drive shafts or said endless chains or toothed belts are configured to be stopped during operation of said article-grouping device independently from one another, such that one or more drive shafts or endless chains or toothed belts may be stopped while one or more others are driven.

4. The article-grouping device according to claim 2, wherein one of said drive shafts is operatively connected with its corresponding pair of endless chains or toothed belts via a connecting arrangement comprising one of: a chain sling or toothed belt, which connects said one of said drive shafts to a sprocket wheel bearing shaft of its corresponding pair of endless chains or toothed belts.

5. The article-grouping device according to claim 4, wherein said divider elements on said crossbeams are interchangeable and/or the distance between them can be varied.

6. The article-grouping device according to claim 5, wherein:
said article-grouping device comprises drive motors configured to drive said drive shafts, and a common control system for the drive motors which can be adapted to the respective number of drive motors and thus pairs of endless chains or toothed belts; and
said drive shafts or said endless chains or toothed belts are configured to be stopped during operation of said article-grouping device independently from one another, such that one or more drive shafts or endless chains or toothed belts may be stopped while one or more others are driven.

7. The article-grouping device according to claim 6, wherein said divider elements are configured to be inserted cyclically at a right angle to a transport plane of said conveyor.

8. The article-grouping device according to claim 1, wherein:
the article-grouping device comprises a plurality of sprockets;
each of said endless chains or toothed belts is supported on two of said sprockets: a drive sprocket configured to move its endless chain or toothed belt, and a support sprocket;
said drive arrangements comprise a first drive arrangement, a second drive arrangement, and a third drive arrangement;
said first drive arrangement comprises a first drive shaft which:
is connected to and drives said drive sprockets of a first pair of said endless chains or toothed belts,
supports said support sprockets of a second pair of said endless chains or toothed belts, and
supports said drive sprockets of a third pair of said endless chains or toothed belts; and
said second drive arrangement comprises a second drive shaft which:
is connected to said drive sprockets of said second pair of said endless chains or toothed belts,
supports said support sprockets of said first pair of said endless chains or toothed belts, and
supports said support sprockets of said third pair of said endless chains or toothed belts.

9. The article-grouping device according to claim 8, wherein said third drive arrangement comprises a third drive shaft operatively connected to said drive sprockets of said third pair of said endless chains or toothed belts.

10. The article-grouping device according to claim 9, wherein:
said third drive arrangement comprises two connecting arrangements and two sprocket bearing shafts;
said sprocket bearing shafts are disposed about said first drive shaft, and each sprocket bearing shaft is connected to and supports a corresponding one of said drive sprockets of said third pair of said endless chains or toothed belts; and
each of said connecting arrangements connects said third drive shaft to a corresponding one of said sprocket bearing shafts to permit said third drive shaft to drive said drive sprockets of said third pair of said endless chains or toothed belts.

11. The article-grouping device according to claim 10, wherein said divider elements on said crossbeams are interchangeable and/or the distance between them can be varied.

12. The article-grouping device according to claim 11, wherein said drive shafts or said endless chains or toothed belts are configured to be stopped during operation of said article-grouping device independently from one another, such that one or more drive shafts or endless chains or toothed belts may be stopped while one or more others are driven.

13. The article-grouping device according to claim 12, wherein:
said article-grouping device comprises: drive motors configured to drive said drive shafts, and a common control system for the drive motors which can be adapted to the respective number of drive motors and thus pairs of endless chains or toothed belts; and
each of said connecting arrangements comprises a chain sling or toothed belt.

14. An article-grouping device comprising:
at least three independently-driven drive arrangements;
a plurality of divider elements;
each of said drive arrangements being configured to move at least one of said divider elements, operatively connected thereto, to a position between adjacent articles in a stream of articles on a conveyor arrangement to divide the stream of articles into separated groups of articles;
each of said drive arrangements comprises a drive shaft and a pair of elongated driven elements;
at least two of said drive shafts are configured to both drive a pair of driven elements and support pairs of driven elements driven by other drive shafts;
said at least three independently-driven drive arrangements comprise first, second, and third drive shafts, and first, second, and third pairs of driven elements which correspond to said drive shafts;
said first and second drive shafts support each of said first, second, and third pairs of said driven elements; and
said third drive shaft is operatively connected in a non-supporting manner with said third pair of driven elements via a connecting arrangement.

15. The article-grouping device according to claim 14, wherein said connecting arrangement of said third drive arrangement comprises:
a pair of chains or belts configured to be rotated by said drive shaft of said third drive arrangement; and
a pair of connecting structures which operatively connect said chains or belts to said third pair of driven elements, which connecting structures are supported in a freely rotatable manner on said first drive shaft.

16. The article-grouping device according to claim 14, wherein said divider elements are located on crossbeams, each of which is mounted on a pair of driven elements, and said divider elements are configured to be pivoted onto or into the surface of their corresponding crossbeam when not in use.

17. The article-grouping device according to claim 16, wherein each of said crossbeams comprises motors operatively connected to said divider elements to pivot said divider elements.

* * * * *